Dec. 22, 1936.　　　　P. FILEHR　　　　2,065,272
METHOD OF AND MEANS FOR REGULATING THE FUEL
FEED OF INTERNAL COMBUSTION ENGINES
Filed Dec. 15, 1933　　　3 Sheets-Sheet 1
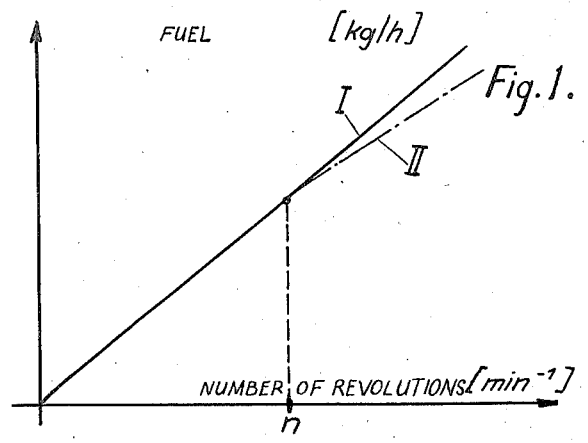
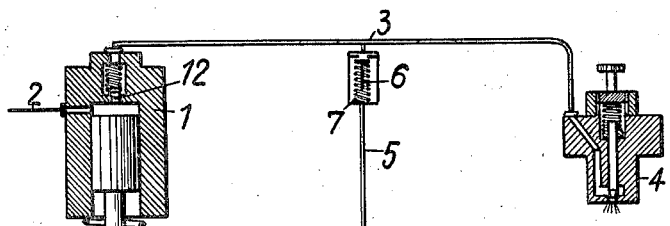
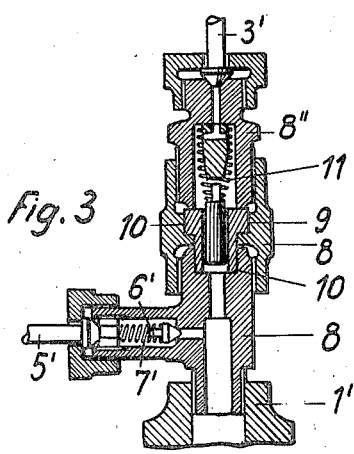
Inventor:
Paul Filehr
by S. Sokal
Attorney

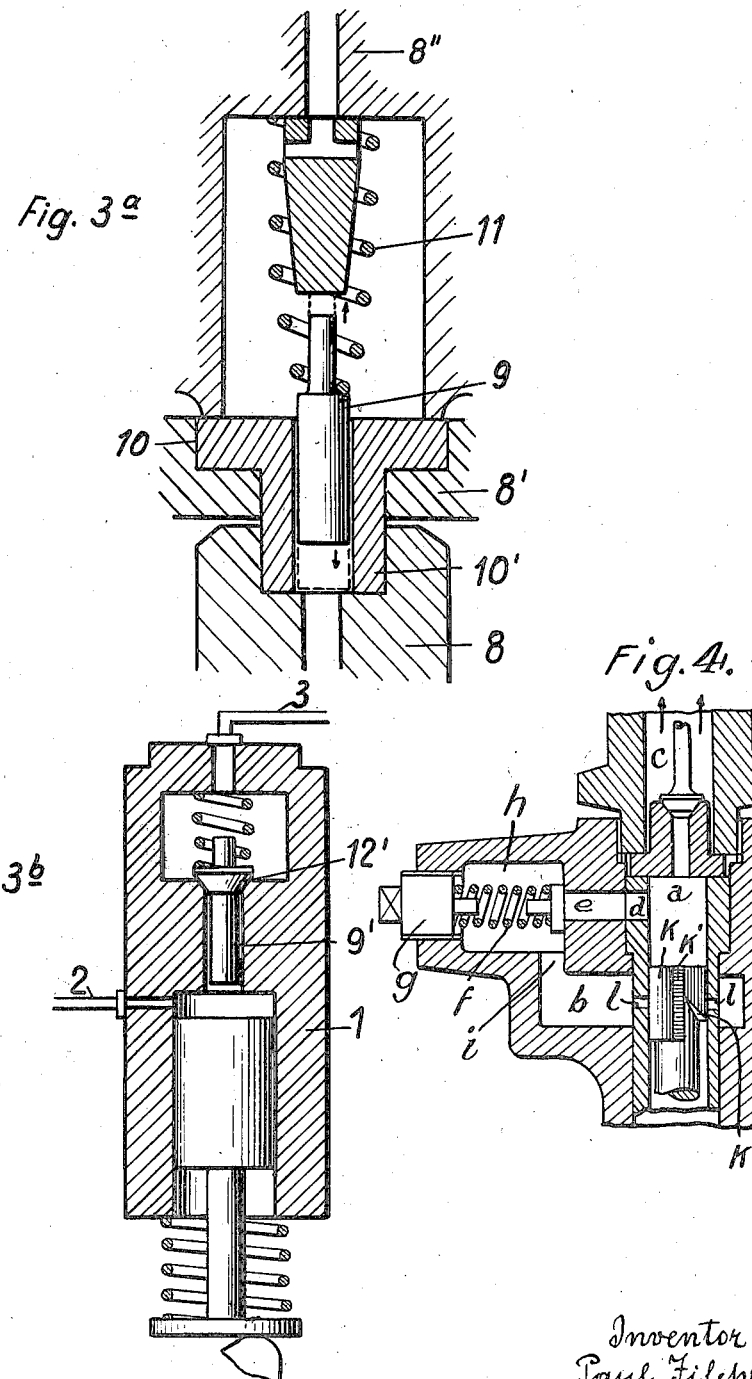

Dec. 22, 1936.    P. FILEHR    2,065,272
METHOD OF AND MEANS FOR REGULATING THE FUEL
FEED OF INTERNAL COMBUSTION ENGINES
Filed Dec. 15, 1933    3 Sheets-Sheet 3

INVENTOR
Paul Filehr
BY
S. Sokal
ATTORNEY

Patented Dec. 22, 1936

2,065,272

UNITED STATES PATENT OFFICE 2,065,272

METHOD OF AND MEANS FOR REGULATING THE FUEL FEED OF INTERNAL COMBUSTION ENGINES

Paul Filehr, Kassel-K, Germany

Application December 15, 1933, Serial No. 702,589
In Germany December 17, 1932

6 Claims. (Cl. 123—139)

Applications were filed in Germany on December 17, 1932 and February 16, 1933.

The present invention relates to a method of and means for regulating the fuel feed of internal combustion engines of the fuel injection or Diesel type.

It has been found that with most Diesel engines the amount of fresh air which reaches the combustion space of the engine, commences to decrease at a certain speed of the engine and that afterwards it decreases further gradually and progressively during the further increase of speed of the engine. With the engine working under full load, that is developing substantially its maximum torque, if the amount of fresh air reaching the combustion space of the engine at lower speeds was just sufficient to ensure a satisfactory combustion of the normal amount of fuel injected per cycle, the difficulty arises that this normal amount of fuel will not find within the combustion chamber the required amount of fresh air. It is the object of the invention to obviate this difficulty and with this object in view the invention consists in regulating the fuel feed of the Diesel engine working under full load, that is developing substantially its maximum torque in such a manner that commencing at a certain speed of the engine at which the amount of fresh air reaching the combustion space begins to decrease, the fuel feed, that is the amount of fuel injected per cycle, is reduced in proportion so that the actual proportion of fuel and air in the combustible mixture is maintained during a very wide range of speeds, whilst the engine is working under a full load, that is developing substantially its maximum torque. It will be understood that this reduction of the fuel feed is gradual and progressive and is maintained during the normal operation of the engine. The reduction of the fuel feed is not such as to have any appreciable affect upon the speed of the engine and is not intended to interfere with or control the speed of the engine. Various methods have been proposed for controlling or reducing the speed of the engine by controlling or reducing the fuel feed, but it is a characteristic feature of all such methods that the reduction of the fuel feed produces immediately a substantial reduction of the power developed by the engine and thereby a reduction of the speed of the engine, and that the reduction of the speed of the engine then produces an increased feed, so that an equilibrium is reached at a certain speed of the engine. Whilst the known method aimed at maintaining or controlling the speed of the engine, the present invention aims at eliminating the waste of fuel due to the employment of a constant feed at widely varying speeds, this aim being attained by maintaining at practically all speeds of the engine substantially the same proportion of air and fuel in the combustion space.

The reduction of the fuel feed is, according to the invention, obtained by devices which respond directly to the pressure existing in the fuel supply conduit, said pressure depending on the speed of the engine and directly on the speed of the fuel pump. The invention does not use any mechanical devices, such as centrifugal regulators, directly responsive to the speed of the engine and so arranged as to reduce the fuel feed at increasing speed.

The invention is preferably carried out by causing a fuel pump to deliver a constant amount of fuel into the conduit leading to the fuel nozzle, and causing a portion of this amount to overflow and be returned to the pump either directly or through a by-pass. Overflow valves, throttling points and combinations of overflow valves and throttling devices may be used for this purpose, and it is particularly pointed out that various arrangements are known in which a portion of the fuel delivered by the fuel pump is at each stroke allowed to overflow and return to the pump and that no claim is made to the use of such devices and arrangements per se, except as a means for gradually reducing the fuel feed within a wide range of speeds and for the object above mentioned.

The invention is illustrated in the accompanying drawings.

Fig. 1 is a diagram showing the fuel supply as a function of the speed or number of revolutions of the engine.

Fig. 2 shows diagrammatically one arrangement for carrying out the invention.

Fig. 3 shows diagrammatically a second arrangement for carrying out the invention.

Fig. 3a shows in larger scale a detail of Fig. 3.

Fig. 3b shows a modification in which a throttle valve is combined directly with a discharge valve.

Fig. 4 shows diagrammatically a third arrangement for carrying out the invention.

Figure 5:
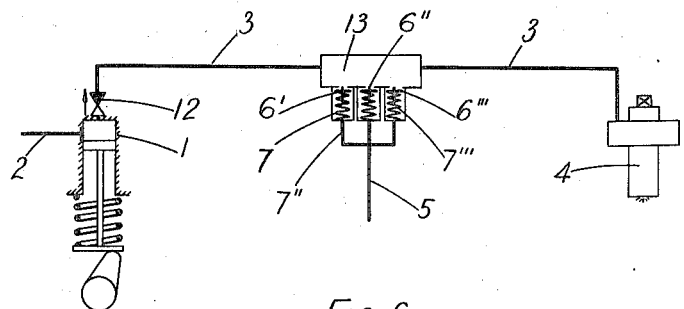
Fig. 5 shows diagrammatically an arrangement in which a plurality of overflow means is used.

Referring first to Fig. 1, the full line I indicates the fuel consumption in kilogrammes per hour of an ordinary Diesel engine as a function of the speed of the engine. Assuming the fuel speed per stroke of the pump to be constant, the fuel consumption is a simple function of the speed of the engine expressed in numbers of revolutions per minute, that is the consumption of fuel in kilogrammes per hour will, when the number of revolutions of the engine is say 400, be double the consumption at the speed corresponding to 200 revolutions per minute. This is the normal fuel consumption curve of an ordinary Diesel engine. The chain dotted line II indicates a different fuel consumption curve which starts at a certain number of revolutions $n$ and corresponds to a fuel feed which is smaller. It is the object of the invention to obtain a fuel consumption curve which, starting at a certain point of the normal curve or straight line I, will lie below the line I. It will be understood that the curves I and II are given only by way of illustration, the essential feature being the fact that curve II is below curve I and does not show any abrupt change. Moreover, the curve II corresponds to a very wide range of speeds with which the engine is to run.

In the arrangement according to Fig. 2 a fuel pump 1 of usual construction, which is positively driven by a Diesel engine with a constant stroke, so that the velocity of discharge of the pump varies directly with the engine speed, supplies fluid received from a duct 2 via a duct 3 to a fuel injection nozzle 4 of ordinary construction, which is mounted upon a cylinder not shown in the drawings. At a point of the delivery duct 3 is branched off an overflow duct 5 which leads back to the fuel reservoir (not shown) or to the admission duct 2 of the fuel pump 1. When the speed of the engine is below $n$, the overflow duct is closed by a non-return valve 6 loaded by a spring 7. The spring pressure is so chosen that the valve 6 will open only at a certain pressure in the delivery duct, and will thereby reduce the amount of fuel reaching the nozzle 4. This arrangement may be modified or amplified by providing besides the one overflow duct 5 a plurality of such overflow ducts, the non-return valves 6 of which are normally held closed by springs, the pressures of the springs being so chosen that when the pressure in the delivery duct 3 increases, an increased amount of fuel will be tapped and caused to overflow from the delivery duct. In this manner any desired form of curve II (Fig. 1) may be obtained.

The arrangement according to Fig. 3 differs from the arrangement shown in Fig. 2 in that the point at which the main fuel supply is tapped, is arranged directly at the fuel pump. For this purpose there is mounted upon the pump casing 1' a three-part casing 8, 8', 8'', which is provided with bores leading to the main fuel delivery duct 3' by which the fuel is delivered. From part 8 of the casing is branched off an overflow duct 5', which is maintained in the closed position by a non-return valve 6 loaded by a spring 7. The tubes containing the ducts 3' and 5' are fixed to their respective casings by means of screw caps which engage the usual connection cones welded to the ends of the tubes, whereby a tight joint is obtained. This arrangement, moreover, differs from the previously described arrangement in that a throttling device is provided. This throttling device comprises a cylindrical plunger 9 which serves for reducing the cross section of the delivery duct of the pump and is movable within a cylindrical bore 10' of a member 10 inserted into the casing. In the construction shown the plunger 9 acts also as a delivery valve. It is controlled by a spring 11. The diameter of the plunger 9 and the bore 10' of the member 10 are so dimensioned as to leave a clearance of the size required for obtaining a throttling action. This arrangement works substantially in the same manner as the previously described arrangement of Fig. 2, with the difference however that by the interposition of the throttling device in the delivery duct 3', the pressure which reaches the fuel discharge nozzle and the duct between the pump and the nozzle is damped, which is an advantage in view of the great sensitiveness of the discharge nozzle.

It may be pointed out that the plunger 9 exerts a pumping action upon the delivery duct 3', so that the portion of the duct lying posterior to the plunger and leading to the fuel nozzle 4, is sucked empty after each delivery stroke, whereby this portion of the duct is relieved of pressure. If required, the throttling device may be arranged at any suitable point of the delivery duct or even at the fuel nozzle itself. In the latter case the throttling device shown in Fig. 3 may be suitably modified. Moreover, the plunger 9 may be combined with the non-return valve 12 of the fuel pump to make a single unit, so that the plunger is constituted by the extended stem of the valve. This arrangement is shown in Fig. 3b, the plunger being designated by the numeral 9' and the delivery valve by the numeral 12'.

It may also be pointed out that besides the throttling of the fuel by the plunger 9 or 9', there occurs also some compression of the fuel in front of or anterior to the plunger 9 in the working space of the fuel pump, whereby a certain amount of fuel is stored during the compression stroke, this stored fuel quantity being then returned after the termination of the delivery stroke to the suction space of the pump.

Fig. 3a shows on a larger scale the throttling device of Fig. 3. The plunger 9 is shown in its middle position, and is indicated by dotted lines and arrows; the movement of the plunger 9 is limited both in the upward and downward direction. A stationary member limiting the upward movement of the plunger 9 contains ports leading to a bore in part 8''. When the speed of the fuel pump increases, the amount of fuel passing through the annular space between the plunger 9 and the member 10 will decrease. Also in the arrangement according to Fig. 3 several overflow ducts may be used which come into action one after the other when the pressure in the delivery duct increases with the speed of the engine.

In the arrangement according to Fig. 4, a store space is associated with the delivery end of the fuel pump, which is closed against the delivery end of the pump by a spring loaded piston exposed to the delivery pressure of the pump. This space is utilized for storing a portion of the fuel delivered by the pump, which is then returned back into the suction space of the pump. $a$ indicates the delivery space of the pump, $b$ the suction space, $c$ the fuel delivery duct, the whole pump being designated by the letter A. $d$ indicates the store space and $e$ indicates a plunger provided with a flange upon which latter acts a spring $f$, the other end of the spring bearing upon a set screw $g$ which serves for regulating the force of the loading spring. Between the suction space $b$ and a space $h$ provided in the rear of the movable plunger $e$, there is a communication duct $i$. The pump piston $k$ is provided with a longitudinal groove $k'$ and a lateral groove $k''$ through which fuel can pass in a certain position of the piston $k$ via lateral bores $l$ from the store space $d$ into the space $b$ during the return stroke of the piston.

The operation of this arrangement is such that with increasing speed of the engine and consequently with increasing pressure in the delivery end $a$ of the pump, the plunger $e$ is displaced against the action of the spring $f$ so as to increase the volume of the space $d$ until the pressure in the space $a$ and the force of the spring $f$ again balance each other. During the delivery stroke a portion of the fuel is stored in the space $d$, and after the termination of the delivery stroke the stored amount of fuel returns to the suction space $b$ of the pump via grooves $k'$, $k''$ and the bores $l$, the spring $f$ at the same time forcing the plunger $e$ back into its initial position. Oil leaking along the piston $e$ into the space $h$ likewise returns through the duct $i$ back into the suction space $b$.

This arrangement is distinguished by very compact construction and great accessibility. After loosening the set screw all the important parts of the device may be readily taken out, whilst the other parts which do not require attention remain undisturbed in their positions.

Fig. 5 shows diagrammatically an arrangement in which a plurality of overflow valves is used. In the delivery duct 3 leading from the pump 1 to the fuel nozzle 4 is interposed a chamber 13 which communicates with a plurality of overflow valves, 6', 6'', 6''', the springs 7', 7'', 7''' of which are of different strengths and are so chosen that the valves will respond at different pressures in the delivery conduit, whereby a gradually increasing quantity of fuel will be allowed to escape by the overflow duct 5. The number of overflow valves depends upon the particular conditions.

Figure 6:
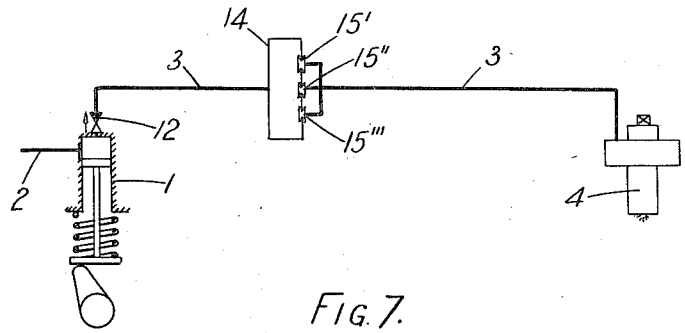
Fig. 6 shows an arrangement in which a plurality of throttle means is used.

Fig. 6 shows diagrammatically an arrangement in which a plurality of throttle points is used. A chamber 4 is interposed in the delivery duct 3 and communicates with the duct through a plurality of throttling devices 15', 15'', 15''', similar to those shown in Figs. 3, 3a and 3b. The plungers used in these throttling devices have different cross sectional passage areas, so that they will come into action progressively. It may be pointed out that as the fuel is capable of being compressed at the very high pressures occurring, it is not necessary to provide in this case separate overflow means, as with the space 14 anterior to the throttling devices 15', 15'', 15''' being suitably dimensioned, the delivery duct itself together with that space 14 will act as a fuel store. The fuel is then compressed during the delivery stroke and is returned partly during the suction stroke of the pump.

Figure 7:
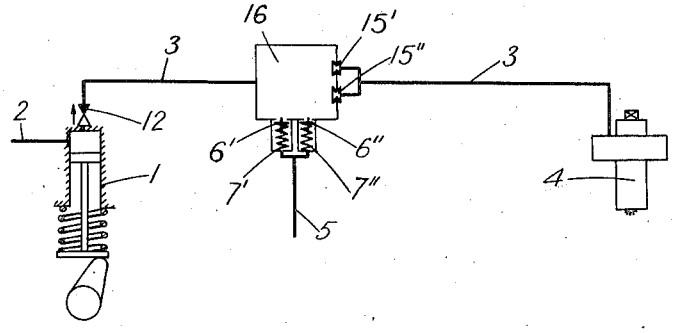
Fig. 7 shows an arrangement in which a combination of a plurality of overflow means with a plurality of throttle means is used.

Fig. 7 shows a combination of a plurality of overflow valves and a plurality of throttling devices. In this case a space 16 is interposed in the delivery duct 3. This space 16 communicates with a plurality of overflow valves 6', 6'' loaded by springs 7' and 7'' of different strengths and therefore coming into action at different pressures and speeds. The space 16 also communicates with a number of throttling devices 15', 15'' having different cross sectional areas.

I claim:

1. The method of controlling the delivery from a reciprocating fuel pump through a feed line to an internal combustion engine at full-load operation over a wide range of speeds, comprising operating the pump cyclically with a constant stroke, and bypassing a portion of the fuel from the feed line proportional to the decrease in the air volumetric efficiency of the engine at the higher speeds to compensate for the decrease in the air charge and thereby maintain the fuel-air ratio constant over the entire range of speeds.

2. The method of controlling the delivery from a reciprocating fuel pump through a feed line to an internal combustion engine at full-load operation over a wide range of speeds, comprising operating the pump cyclically with a constant stroke, by-passing a portion of the fuel from the feed line after the pressure in the fuel line has reached a predetermined pressure, and also throttling the flow of fuel through the feed line so that the flow of fuel to the engine is proportional to the decreased volumetric efficiency of the engine at the higher speeds to compensate for the decrease in the air charge and thereby maintain the fuel-air ratio substantially constant over the entire range of speeds.

3. The method of controlling the delivery of fuel to an internal combustion engine to maintain a substantially constant ratio of air and fuel in the combustion chamber during the whole range of speeds, comprising proportionally increasing the delivery pressure of the fuel to a feed line as the speed of the engine increases, and gradually and proportionally increasing said pressure to the feed line over the pressure from the line to the engine after a predetermined speed has been reached proportional to the decrease in the air volumetric efficiency of the engine at higher speeds to compensate for the decrease in the air charge and thereby maintain the fuel-air ratio substantially constant over the entire range of speeds.

4. The method according to claim 3, further characterized in that the excess portion of the fuel fed to the feed line is by-passed from the fuel feed line.

5. The method according to claim 3, further characterized in that the excess portion of the fuel fed to the feed line is throttled.

6. The method of controlling the delivery from a reciprocating fuel pump through a feed line to a Diesel engine driving a car at full load operation over a wide range of speeds, comprising operating the pump cyclically with a constant stroke and gradually increasing the pressure in the feed line beyond the pump as the speed increases over the pressure from the line to the engine after a predetermined speed has been reached and in proportion to the decrease in the air volumetric efficiency of the engine to compensate for the decrease in the air charge and thereby maintain the fuel-air ratio constant over the entire range of speeds, said proportional increase of pressure in the feed line beyond the pump over the pressure from the line to the engine being produced by utilization of the increase in the actual delivery pressure of the pump occurring with the increase of the speed of the pump.

PAUL FILEHR.